3,404,169
PREPARATION OF VINYLSILANES BY
Si-H-ACETYLENE ADDITION
Maurice Henri Robert Jules Gaignon, Tassin-la-Demi-Lune, and Marcel Joseph Celestin Lefort, Lyon, France, assignors to Rhone-Poulenc S.A., Paris, France, a corporation of France
No Drawing. Filed Dec. 10, 1964, Ser. No. 417,471
Claims priority, application France, Dec. 18, 1964, 957,652
5 Claims. (Cl. 260—448.2)

ABSTRACT OF THE DISCLOSURE

Vinyl-halosilanes are produced by reaction of acetylene with a halo-hydrogenosilane at atmospheric pressure and elevated temperature in a liquid aromatic diluent in the presence of a platinum catalyst. The vinyl-halosilanes produced can be used in the manufacture of various organosilicon polymers, such as elastomers and resins.

---

This invention relates to the preparation of vinylsilanes.

Vinyl-halosilanes are interesting industrial products which can be used in the manufacture of various organosilicon polymers, such as elastomers and resins. They have heretofore been obtained in various ways, none of which has been entirely satisfactory. They have, for example, been prepared by reacting vinyl chloride with silicon in the presence of a catalyst, but this process has the disadvantage that it gives low yields and necessitates working at high temperature.

It has also been proposed to react a vinylmagnesium halide with a halosilane in tetrahydrofuran. This process is applicable only to certain categories of vinyl-halosilanes.

Vinylsilanes have also been prepared by reacting vinyl chloride with chlorohydrogenosilanes, but this process unfortunately necessitates very high temperatures (550°–650° C.) and gives yields which scarcely exceed 50%.

Finally, it has been proposed to prepare vinyl-halosilanes by reacting acetylene in an autoclave with halo-hydrogenosilanes in the presence of a catalyst, e.g. a peroxide or platinum in various forms. Such processes, in which acetylene is used under pressure, are obviously very dangerous. Moreover, because of the high mobility of the hydrogen atom, due to the presence of halogen atoms attached to the silicon atom carrying the Si-H linkage, this reaction is not selective and a large proportion of the corresponding halogenated disilylethanes are produced.

This invention provides a new process in which some or all of these disadvantages are mitigated or overcome. The process of the invention comprises reacting acetylene, at atmospheric pressure and at moderate temperature in the presence of an inert liquid diluent and a platinum catalyst, with a halo-silane of formula:

$$R_xSiH_yX_z \qquad (I)$$

where $x$ is 0 to 2, $y$ is 1 or 2, and $z$ is 1, 2 or 3, the sum of $x$, $y$ and $z$ being 4, X is halogen, and R is a non-reactive, monovalent organic radical. The process is especially useful in relation to the product of vinyl-halosilanes of the formula:

$$R_{3-a-b}SiH_aCl_b \cdot CH{=}CH_2 \qquad (II)$$

from halo-silanes of the formula:

$$R_{3-a-b}SiH_{a+1}Cl_b \qquad (III)$$

where $a$ is 0 or 1, $b$ is 1, 2 or 3, and R is alkyl, fluoroalkyl, chloroalkyl, cyanoalkyl, cycloalkyl of 5 to 6 carbon atoms, phenyl, chlorophenyl, or (lower alkyl)phenyl. By "lower alkyl" is meant alkyl of 1 to 6 carbon atoms. Specific examples of R include alkyl radicals such as, for example, methyl, ethyl, propyl, butyl, hexyl or octyl, optionally substituted by a chlorine or fluorine atom or by a cyano group; alicyclic radicals such as cyclohexyl, cyclopentyl or methylcyclohexyl; and phenyl radicals optionally substituted by one or more chlorine atoms and/or by one or more lower alkyl radicals such as methyl or ethyl.

Preferred starting materials include, more especially, the following products:

dichlorisilane,
trichlorosilane,
monomethyldichlorosilane,
dimethylmonochlorosilane,
monoethyldichlorosilane,
diethylmonochlorosilane,
monophenyldichlorosilane, and
diphenylmonochlorisilane;

from which it is possible to prepare compounds such as monovinyldichlorosilane,
monovinyltrichlorosilane,
monovinylmonomethyldichlorosilane, and
monovinyldimethylchlorosilane.

When $a$ is equal to 1, i.e. when the compound of Formula II possesses two hydrogen atoms linked to the silicon atom, this compound combines, under the conditions of the reaction, with substantially only one acetylene molecule.

Although the reaction may be carried out at relatively low temperatures, for example 80° C., it is generally preferred to operate at higher temperatures so as to increase the rate of reaction. However, no advantage is derived from operating at excessively high temperatures, and in practice there is generally no advantage in exceeding 120° C. A range of 80° to 120° C. is therefore preferred. The diluents which may be employed in the new process are ordinarily organic compounds which remain completely liquid at the reaction temperature and in the presence of the reactants.

Examples of diluents include aromatic hydrocarbons, especially benzene or naphthalene derivatives liquid at atmospheric pressure in at least a major part of the temperature range 80° to 120° C.; and in particular alkyl and/or chloro derivatives of benzene, especially xylene, cumene, monochlorobenzene, o-dichlorobenzene, chlorotoluenes, diphenyl, and diphenyl oxide; and also tetralin.

The quantity of diluent employed is not critical, and depends to a very large extent upon the operating conditions, such as the form of the apparatus, the rate at which the reactants are introduced, and the total quantity of reactants. In the process of the invention, it is possible to operate without disadvantage in the presence of the vinyl-halosilane formed and dispersed in the diluent, even with a relatively high vinyl-halosilane concentration.

The catalyst employed is metallic platinum, but it may be added to the reaction mixture as a platinum compound reduced to metallic platinum under the conditions of the reaction, e.g. chloroplatinic acid. When metallic platinum is added as such any of the known forms of finely divided platinum used as catalysts may be used, more especially finely divided platinum supported on, e.g. asbestos, alumina, carbon or silica. Suitable platinum compounds include chloroplatinic acid and platinum-olefin complexes.

It is especially advantageous to use in the process of the invention a platinum catalyst produced by reducing platinic oxide or chloroplatinic acid with a halo-silane of Formula I.

The quantity of catalyst employed is not critical, and may vary within fairly wide limits, depending upon all the operating conditions. Very small quantities may be employed, for example as little as 0.5 mg. of platinum per gram-molecule of silicon compound employed. However, it may be advantageous to use higher proportions of catalyst, though it is generally unnecessary to exceed 50 mg. of platinum per mole of silicon compound.

In order that the halo-silane starting material may not react with the vinyl-halosilane formed, the operation is preferably carried out using a slight excess of acetylene over the stoichiometric quantity.

In practice, the process may be carried out as follows: The acetylene and the silicon compound are introduced into the diluent containing the catalyst heated to the temperature chosen for the reaction, care being taken to produce an intimate contact between the reactants at the point of their introduction into the reaction medium. Preferably, the reactants are introduced in premixed form through a single tube. In addition, it may be advantageous to use a suitable agitating device to homogenise the reaction mass and avoid local over-heating. The vinylsilanes obtained can be very readily separated, for example by distillation.

The process of the invention may be carried out discontinuously or continuously. It is also to be understood that the process is applicable not only to the reaction of acetylene with a single silicon compound, but also to the reaction of acetylene with a mixture of silicon compounds.

The following examples illustrate the invention.

Example 1

The apparatus employed is a 0.5 litre four-necked round-bottomed flask fitted with a central agitating device, a water condenser having mounted thereon a glass coil cooled by a mixture of ethanol and solid carbon dioxide (the whole connected with the atmosphere through a calcium chloride drying column and a bubble counter), a thermometer and a tube for the introduction of the reactants. The latter is in the form of a Y, one arm of which is connected to a source of acetylene, while the other is fitted to a dropping funnel for the introduction of the silicon compound, and the foot dips into the reaction medium. The end of the dipping tube is provided with a sintered-glass cylinder 15 mm. in diameter and having pores of 90μ. Disposed in series between the source of acetylene and the Y-shaped tube are a flowmeter and a drying unit for removing any moisture present in the acetylene.

300 cc. of ortho-dichlorobenzene and 3.2 mg. of finely divided platinum are placed in this apparatus, and the atmosphere in the whole apparatus is then swept with a current of nitrogen. The dichlorobenzene is heated to 105° C. and, at this temperature, acetylene is fed in at a rate of 8 litres per hour, and trichlorosilane is passed through the funnel at a rate of 29 cc. per hour. The trichlorosilane vaporizes as soon as it reaches the hot zone of the Y-shaped tube. The reaction is instantaneous, occurring as soon as the gas mixture has penetrated the reaction medium, and in addition, exothermic. The heating conditions are, therefore, adjusted so that the temperature does not exceed 110° C. At the end of 3½ hours 28 litres of acetylene and 100 cc. (135.5 g.) of trichlorosilane have been introduced in all. When the atmosphere has been purged with a current of dry nitrogen, the separation of the product is effected by simple distillation. 135.5 g. of liquid product, boiling at 89°–91° C. under atmospheric pressure (755 mm. Hg), are thus obtained, identified as vinyltrichlorosilane.

In addition, a second fraction of 18 g. is obtained, which is a mixture of ortho-dichlorobenzene containing vinyltrichlorosilane (6 g. according to the analysis). A third fraction of the distillate consists of recovered o-dichlorobenzene, and a residue of 9.5 g. of a product identified as 1,2-bis-(trichlorosilyl)-ethane remains.

Taking into account the vinyltrichlorosilane contained in the second fraction, the total yield of vinyltrichlorosilane is 87% calculated on the trichlorosilane employed.

In this example, and in the following examples, the volumes of acetylene indicated are volumes at 0° C. and 760 mm. Hg pressure.

The catalyst employed in this example was introduced in the form of a suspension (2 cc.) containing 0.16% of Pt, and derived from the reduction of 0.5 g. of Adams platinum oxide with a mixture of 200 cc. of methyldichlorosilane and 50 cc. of diphenylsilane.

Example 2

In the same apparatus as in Example 1, a similar operation is performed, the reaction mixture consisting of 300 cc. of cumene, the platinum catalyst being introduced as chloroplatinic acid (quantity equivalent to 3.5 mg. of platinum) and the silicon compound being methyldichlorosilane. The reactants were introduced at a rate of 14 litres per hour in the case of the acetylene and 52 cc. per hour in the case of the methyldichlorosilane. At the end of 2 hours, therefore, 28 litres of acetylene and 104 cc. (115 g.) of methyldichlorosilane have been introduced. The separation, which was performed as indicated in Example 1, gave: 108.2 g. of product, identified as methylvinyldichlorosilane, distilling at 92–94° C. under atmospheric pressure (750 mm. Hg); 17.5 g. of a mixture of cumene and 13.4 g. of methylvinyldichlorosilane; and 9.3 g. of a residue consisting of 1,2-bis-(methyldichlorosilyl) ethane and a little cumene.

Taking into account the methylvinyldichlorosilane of the second fraction, which is recoverable, the yield is 86% of the theoretical, calculated on the methyldichlorosilane.

The chloroplatinic acid is introduced as a solution in isopropanol (0.35 cc.). This small quantity of isopropanol causes substantially no disturbance of the reaction.

Example 3

The operation is carried out as in Example 1, the reaction medium consisting of 300 cc. of o-dichlorobenzene, the catalyst being introduced as chloroplatinic acid (quantity equivalent to 3 mg. of Pt), the silicon compound being trichlorosilane (supplied at 45 cc./hour), and the rate of supply of acetylene being 11 litres per hour. At the end of 2 hours, 15 minutes, 135.5 g. (1 mole) of trichlorosilane and 25 litres of acetylene have thus been introduced. The separation, which was performed as in Example 1, gave: 136 g. of vinyltrichlorosilane, and 43 g. of a mixture containing 4.6 g. of recoverable vinyltrichlorosilane, making a yield of 87% in all, calculated on the trichlorosilane employed.

In this experiment, 9.4 g. of 1,2-bis-(trichlorosilyl)-ethane were also recovered.

Example 4

The operation is carried out as in Example 1, the reaction medium consisting of 300 cc. of o-dichlorobenzene, the catalyst consisting of 3.2 mg. of finely divided platinum prepared in the same way as in Example 1, the silicon compound being dimethylchlorosilane (supplied at 71 cc. per hour), and the rate of supply of acetylene being 16 litres per hour. The temperature is maintained at 86–88° C. throughout the experiment. At the end of 1½ hours, 24 litres of acetylene and 94.5 g. (1 mole) of dimethylchlorosilane have been introduced.

After separation, there are obtained 97.5 g. of dimethylvinylchlorosilane, i.e. a yield of 81%.

Example 5

The operation is carried out as in Example 1, the reaction mixture consisting of 300 cc. of o-dichlorobenzene, the catalyst consisting of 0.01 g. of platinum (as carbon carrying 5% of platinum), the silicon compound being methyldichlorosilane (supplied at 34 cc. per hour), and the rate of supply of acetylene being 8 litres per hour. At the end of 3 hours, 115 g. (1 mole) of methyldichlorosilane and 24 litres of acetylene have been introduced. The temperature is maintained at 114–116° C. throughout the operation. On distillation, there are obtained 124.5 g. of methylvinyldichlorosilane and a fraction of 21 g., from which 4.5 g. of methylvinyldichlorosilane can be recovered. The total yield is 91%.

From the distillation residue, 8 g. of 1,2-bis-(methyldichlorosilyl)ethane can be isolated.

Example 6

The procedure of Example 1 is followed, using 300 cc. of cumene as diluent, chloroplatinic acid (a quantity equivalent to 1.88 mg. of Pt), and 215 g. (1.23 mole) of phenyldichlorosilane. The reactor is heated with a bath maintained at 145° C., and the acetylene is introduced at a rate of 10 litres per hour for 6 hours, the reaction temperature being maintained at 110–115° C.

Distillation yields 200 g. of phenylvinyldichlorosilane, B.P./15 mm. Hg=99.5° C.; a yield of 80%.

Example 7

The procedure of Example 1 is followed, using 300 cc. of freshly distilled tetralin and a quantity of chloroplatinic acid (in solution in isopropanol) equivalent to 1.1 mg. of platinum. The acetylene is introduced at a rate of 3.5 litres per hour, and methyldichlorosilane is run in at a rate of 13 cc. per hour, the temperature of the reaction medium being maintained at 109–112° C. At the end of 4 hours, 14 litres of acetylene and 52 cc. (57.5 g.) of methyldichlorosilane have been introduced in all. On distillation, 54.5 g. of liquid product boiling at 92–94° C. under atmospheric pressure, identified as vinylmethyldichlorosilane, are obtained. In addition, a second fraction of 7.1 g. is obtained, which is a mixture of vinylmethyldichlorosilane (5 g.) and tetralin.

Taking into account the vinylmethyldichlorosilane obtained in the second fraction, the total yield of vinylmethyldichlorosilane is 83%, calculated on the methyldichlorosilane employed.

Example 8

Acetylene and trichlorosilane are continuously reacted in an apparatus having a useful capacity of 350 cc., provided with a double heating jacket and a Y-shaped tube for the introduction of the reactants, the foot of this tube which extends to the bottom of the reactor being terminated by a sintered glass cylinder 5 cm. in diameter, having pores of 90μ. In addition, a reflux condenser cooled at −20° C. is mounted on the top of this reactor, to which is connected a condenser for retaining the trichlorosilane which may be entrained by the acetylene not absorbed in the reactor. The reactor is initially charged with 350 cc. of o-dichlorobenzene and 17 mg. of chloroplatinic acid. The apparatus is heated by circulating through the double jacket a fluid heated at 100° C. Into the hot o-dichlorobenzene are simultaneously introduced 60 litres per hour of acetylene and 223 cc. per hour of trichlorosilane. The contents of the reactor gradually pass by way of an overflow into a distillation apparatus which distils the vinyltrichlorosilane formed and the unreacted trichlorosilane, while the solvent and the entrained catalyst pass to the boiler of the distillation apparatus and, from there, return to the reactor. The rate of flow of the recycled solvent is adjusted to a ratio of 4:1 in relation to the rate of supply of the trichlorosilane.

Owing to the evolution of heat caused by the reaction, the temperature is maintained at 104–108° C. in the reactor without any increase in the heating by the double jacket.

At the end of 6 hours, 20 minutes, 380 litres of acetylene and 1775 g. (13.1 moles) of trichlorosilane have been introduced into the reactor, while the distillation apparatus has produced 1775 g. of distillate, from which are extracted by rectification, 225.5 g. of unreacted trichlorosilane and 1542 g. of vinyltrichlorosilane. The contents of the reactor and the boiler at the end of the operation yield a further 78 g. of vinyltrichlorosilane, and 58.5 g. of entrained trichlorosilane are recovered from the cooled chamber placed on the gas outlet of the reactor. Thus, 1620 g. of vinyltrichlorosilane are produced and 284 g. of trichlorosilane recovered in all, which gives a vinyltrichlorosilane yield of 91%, calculated on the trichlorosilane used up.

We claim:
1. Process for the preparation of a vinyl-halosilane which comprises simultaneously and progressively introducing into an aromatic compound liquid at atmospheric pressure in at least a major part of the temperature range 80° to 120° C., at atmospheric pressure, at a temperature from 80° C. to the boiling point of the reaction medium, and in the presence of a platinum catalyst, (A) acetylene and (B) a halo-silane of formula: $R_xSiH_yX_z$, where $x$ is 0 or 1, $y$ is 1 or 2, $z$ is 1, 2 or 3, the sum of $x+y+z$ being 4, X is halogen, and R is a non-reactive, monovalent organic radical.

2. Process according to claim 1 in which the halo-silane has the formula:

$$R_{3-a-b}SiH_{a+1}Cl_b$$

where $a$ is an integer from 0 to 1, $b$ is an integer from 1 to 3, and R is a member selected from the class consisting of alkyl, fluoroalkyl, chloroalkyl, cyanoalkyl, cycloalkyl of 5 to 6 carbon atoms, phenyl, chlorophenyl and (lower alkyl)phenyl, and the vinyl-halosilane produced has the formula:

$$R_{3-a-b}SiH_aCl_b\cdot CH=CH_2$$

3. Process according to claim 1 in which the diluent is selected from the class consisting of xylene, cumene, monochlorobenzene, o-dichlorobenzene, α-chlorotoluene, diphenyl, diphenyl oxide, and Tetralin.

4. Process according to claim 1 in which the reaction is carried out at 80° to 120° C.

5. Process according to claim 1 in which the amount of platinum catalyst used is such as to provide 0.5 to 50 mg. of platinum per gram-molecule of halo-silane starting material.

References Cited

UNITED STATES PATENTS

| | | | |
|---|---|---|---|
| 2,823,218 | 2/1958 | Speier et al. | 260—448.2 |
| 3,220,972 | 11/1965 | Lamoreaux | 260—448.2 |

TOBIAS E. LEVOW, *Primary Examiner.*

J. PODGORSKI, *Assistant Examiner.*